United States Patent [19]
Bock

[11] Patent Number: 6,064,173
[45] Date of Patent: May 16, 2000

[54] APPLICATION-SPECIFIC ELECTRONIC MOTOR STARTER

[75] Inventor: Christopher H. Bock, Shorewood, Wis.

[73] Assignee: Allen-Bradley Company, LLC, Milwaukee, Wis.

[21] Appl. No.: 08/883,411

[22] Filed: Jun. 26, 1997

[51] Int. Cl.[7] .................................................. H02P 1/46
[52] U.S. Cl. ........................ 318/716; 318/723; 318/807
[58] Field of Search .............................. 318/727, 434, 318/712, 719, 723, 778, 780, 779, 798, 800–803, 807–812, 700, 705–707, 551, 716; 187/103, 119, 104; 361/29

[56] References Cited

U.S. PATENT DOCUMENTS

| | | | |
|---|---|---|---|
| 4,042,965 | 8/1977 | Wisman | 361/29 |
| 4,220,902 | 9/1980 | Aronsson et al. | 318/434 |
| 4,449,082 | 5/1984 | Webster | 318/271 |
| 4,616,166 | 10/1986 | Cooper et al. | 318/712 |
| 4,721,188 | 1/1988 | Araki et al. | 187/296 |
| 5,027,049 | 6/1991 | Pratt et al. | 318/807 |
| 5,196,656 | 3/1993 | Mizuno et al. | 187/314 |
| 5,271,346 | 12/1993 | Mori | 112/220 |
| 5,296,791 | 3/1994 | Hipp | 318/563 |
| 5,387,855 | 2/1995 | Miyazaki et al. | 318/805 |
| 5,402,054 | 3/1995 | Eckersley | 318/801 |
| 5,625,262 | 4/1997 | Lapota | 318/71 |
| 5,705,904 | 1/1998 | Kuriyama | 318/439 |
| 5,764,022 | 6/1998 | Kazama et al. | 318/801 |

*Primary Examiner*—Brian Sircus
*Attorney, Agent, or Firm*—Joseph N. Ziebert; John J. Horn; A.M. Gerasimow

[57] ABSTRACT

A motor control system or electronic motor starter is optimized to replace electromechanical motor starters. Heat dissipation requirements are reduced by utilizing a by-pass contactor when the motor is in a run mode. The electronic motor starter derives power from an AC motor control signal conventionally utilized to power the coritactor coil associated with a conventional electromechanical starter.

20 Claims, 8 Drawing Sheets

APPLICATION-SPECIFIC ELECTRONIC MOTOR STARTER

FIELD OF THE INVENTION

The present invention relates generally to an electronic motor starter. More particularly, the present invention relates to an electronic motor starter optimized to replace electromechanical motor starters.

BACKGROUND OF THE INVENTION

Various products which incorporate or utilize single phase or three phase induction motors can benefit from the use of an electronic motor starter. For example, an electronic motor starter can provide many advantageous features, including: controlled in-rush currents, smoother starting torque profiles, and system fault detection. However, due to the high cost of electronic motor starters relative to electromechanical starters, products which include or utilize motors often rely on electromechanical starters.

Generally, a significant portion of the cost of an electronic motor starter is related to the heat dissipation requirements associated with the power semiconductor devices which control the amount of current provided to the motor. These heat dissipation requirements typically command that large heat sinks be attached to the power semiconductor devices of the electronic motor starter. These large heat sinks are required to provide a method of removing the large amount of heat energy produced in the power semiconductor devices that control the motor's operation. The quantity of the materials used and the manufacturing processes performed to create these heat sinks add greatly to the cost of the electronic starter. The large heat sinks are also primarily responsible for the overall size and weight of the electronic starter.

Additionally, the higher cost of the electronic motor starters is somewhat related to the current capability and packaging of the power semiconductor device. For electronic starters, choosing power semiconductor devices that can handle the thermal issues associated with the continuous operation of the motor add additional expense to the starter.

Further, electronic motor starters require a power supply to power the operation of the electronics controlling the firing of the motor. A user interface is often included with electronic motor starters which allows the user to set particular starting and running characteristics for the motor. The power supply and user interface can add additional expense to the electronic motor starter.

Thus, there is a need for an electronic motor starter which can be utilized in motor control applications typically handled by less expensive electromechanical motor starters. Further, there is a need for a low-cost electronic motor starter which can be retrofitted to replace existing electromechanical motor starters. Further still, there is a need for an electronic motor starter which can be utilized in cost-sensitive motor control applications and yet provide the advantages associated with an electronic motor starter, such as, reduced in-rush currents, smoother starting torque profiles, and system fault detection. Even further still, there is a need for an electronic motor starter optimized to reduce heat dissipation requirements.

SUMMARY OF THE INVENTION

The present invention relates to a motor control system for receiving a motor run signal and for controlling the motor in response to the motor run signal. The motor is powered by an AC power signal. The motor starter system includes a power supply and a control circuit. The power supply has a control input and a power output. The control input receives the motor run signal, and the power supply provides a DC power signal at the power output in response to the motor run signal. The control circuit receives the DC power signal and performs a motor control routine in response to the DC power signal. The control circuit applies the AC power signal to the motor in response to the motor control routine.

The present invention further relates to a motor controller system for providing a mechanism for controlling the application of a motor power signal from a power line to a motor in response to a motor control signal. The motor controller system includes a mechanical switch coupled between the power line and the motor, a semiconductor switch coupled between the power line and the motor, a power supply, and a control circuit. The power supply has an input and an output. The input receives the motor control signal, and the output provides a circuit power signal in response to a presence of the motor run signal. The control circuit is powered by the circuit power signal and provides the motor power signal through the semiconductor switch when the circuit power signal is initially provided and later provides the motor power signal through the mechanical switch.

The present invention still further relates to a motor starter system for receiving a motor run signal and for controlling the motor in response to the motor run signal. The motor starter system includes a first switch means for providing the AC power signal to the motor in response to a first control signal, a second switch means for providing the AC power signal through the motor in response to a second control signal, a power supply means for receiving the motor run signal and for converting the motor run signal to a DC power signal, and a control means for providing the second control signal when the DC power signal is initially received and for subsequently providing the first control signal. The control means is powered by the DC power signal.

The present invention even still further relates to a method of controlling a motor with an electronic motor starter system. The electronic motor starter system includes a motor control input, a control circuit, a semiconductor switch, and a mechanical switch. The method includes powering the control circuit with a motor control signal provided to the motor control input, providing a motor power signal to the motor by closing the semiconductor switch with the control circuit when the control circuit is initially powered, and subsequently providing the motor power signal to the motor by closing the mechanical switch with the control circuit.

In a first exemplary aspect of the present invention, an electronic motor starter can be utilized with either a wye-wound or a delta-wound motor and provides fault detection, stall detection, and short circuit detection for the motor application. The electronic motor starter utilizes a bypass relay to close an AC-1 rated contactor to eliminate heat dissipation from the power semiconductors after a motor start sequence is completed, and the motor is in a run mode.

In a second exemplary embodiment of the present invention, the electronic motor starter is utilized in applications which have limited duty cycles for starts and stops, thereby reducing the heat dissipation requirements for the motor starter. Preferably, the control circuit utilizes a bypass relay which controls an AC-1 rated contactor. The motor starter is tailored for low-cost operations because the limited duty cycle and the bypass relay reduce the heat dissipation criteria and, hence, the expense associated with conventional electronic motor starters.

According to yet another exemplary aspect of the present invention, the electronic motor starter utilizes a microprocessor. The microprocessor performs a software routine according to a starting profile designed to optimize any or all of the following characteristics: in-rush current, starting torque, or starting time. The profile preferably generates a minimum amount of heat in the power semiconductors. The microprocessor can be programmed for various motor start applications. The microprocessor can also monitor the AC power signal to ensure that the correct phase rotation is present.

In still a further exemplary aspect of the present invention, the electronic motor starter can be easily retrofitted into existing applications which employ an electromechanical motor starter. The electronic motor starter derives its operating power from the motor start signal ordinarily provided to the coils of the electromechanical motor starter. The electronic motor starter converts the 24 V AC to 600 V AC motor start signal to a 5 volt DC signal which is utilized by a microprocessor. The power supply preferably has a storage capacitor to allow the microprocessor to be powered for a period of time after the motor start signal is removed. The microprocessor preferably performs a motor start software routine, a motor stop software routine, and a motor run software routine to most efficiently start, stop, and run the motor.

BRIEF DESCRIPTION OF THE DRAWINGS

Preferred embodiments of the invention will hereinafter be described in conjunction with the appending drawings, wherein like numerals denote like elements, and:

FIGS. 2A, 2B, and 2C are stacked on top of each other, and FIG. 2D is located to the right side of FIGS. 2A, 2B, and 2C;

DETAILED DESCRIPTION OF THE PREFERRED EXEMPLARY EMBODIMENTS OF THE PRESENT INVENTION

Figure 1:
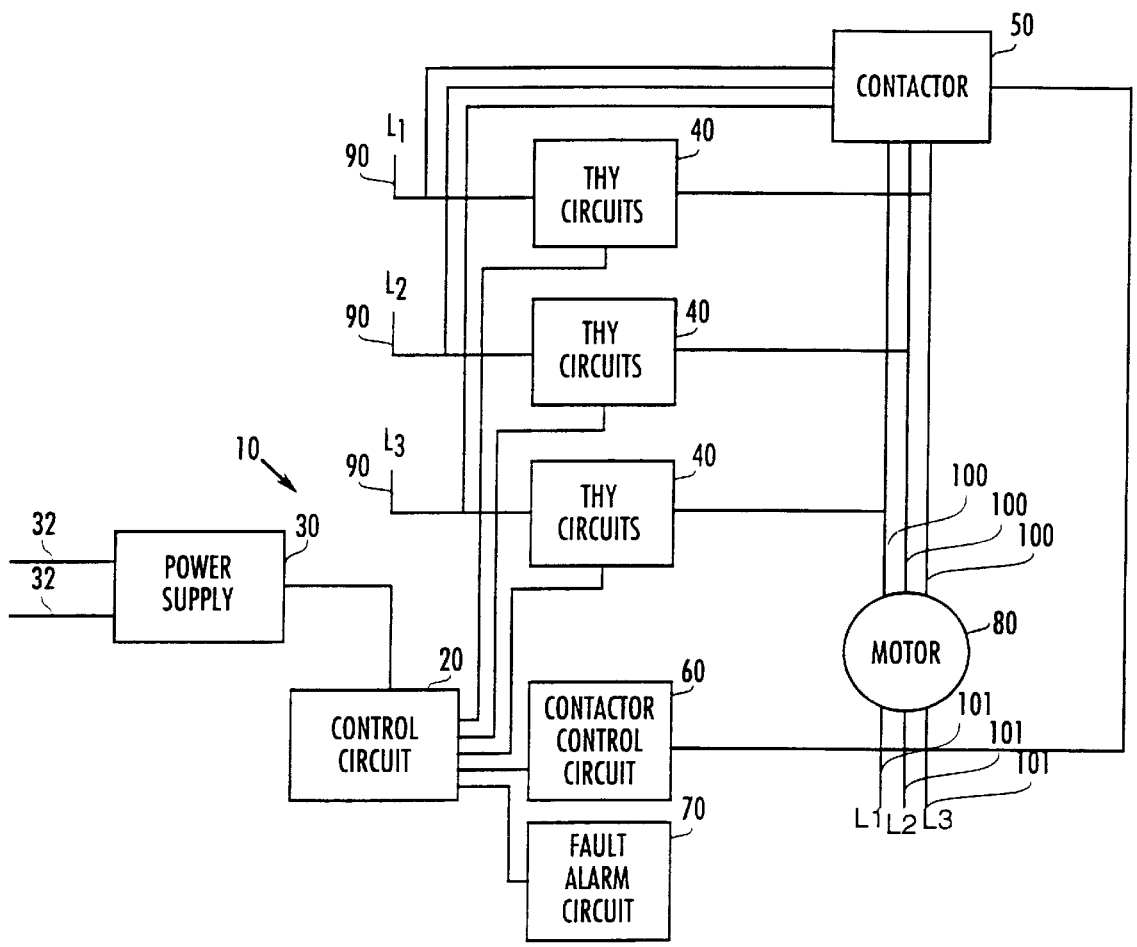
FIG. 1 is an exemplary block diagram of the electronic motor starter system coupled to a load such as a three-phase motor.
Figure 2A:
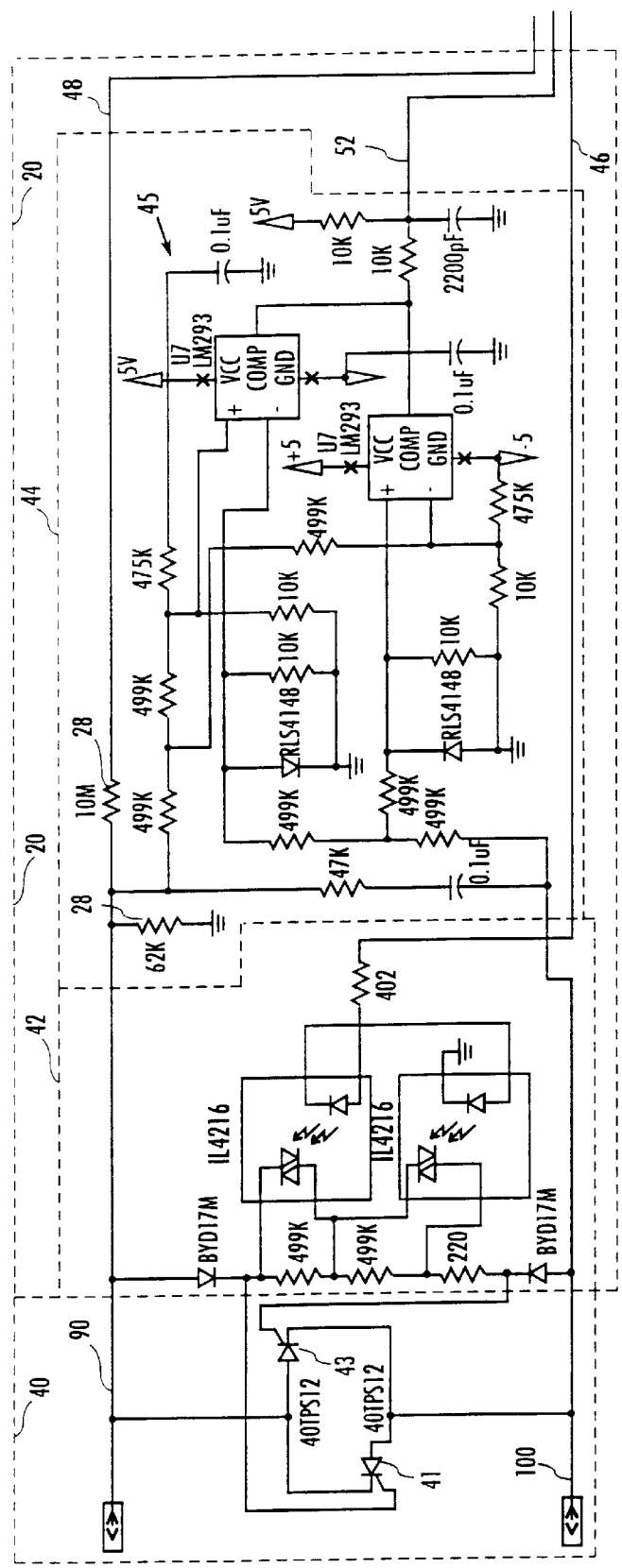
FIGS. 2A, 2B, 2C, and 2D are a more detailed electrical schematic drawing of a control circuit for the electronic motor starter system illustrated in FIG. 1 and are all collectively referred to as FIG. 2, where
Figure 2B:
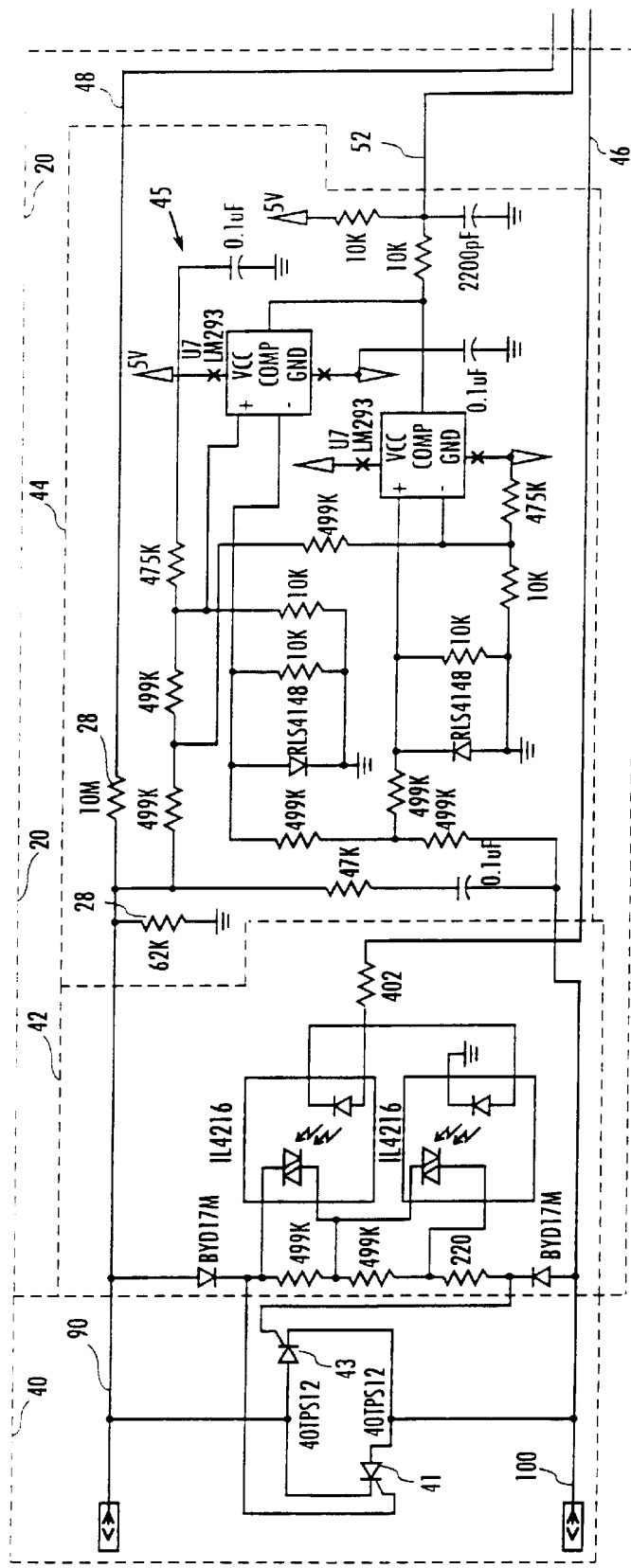
Figure 2C:
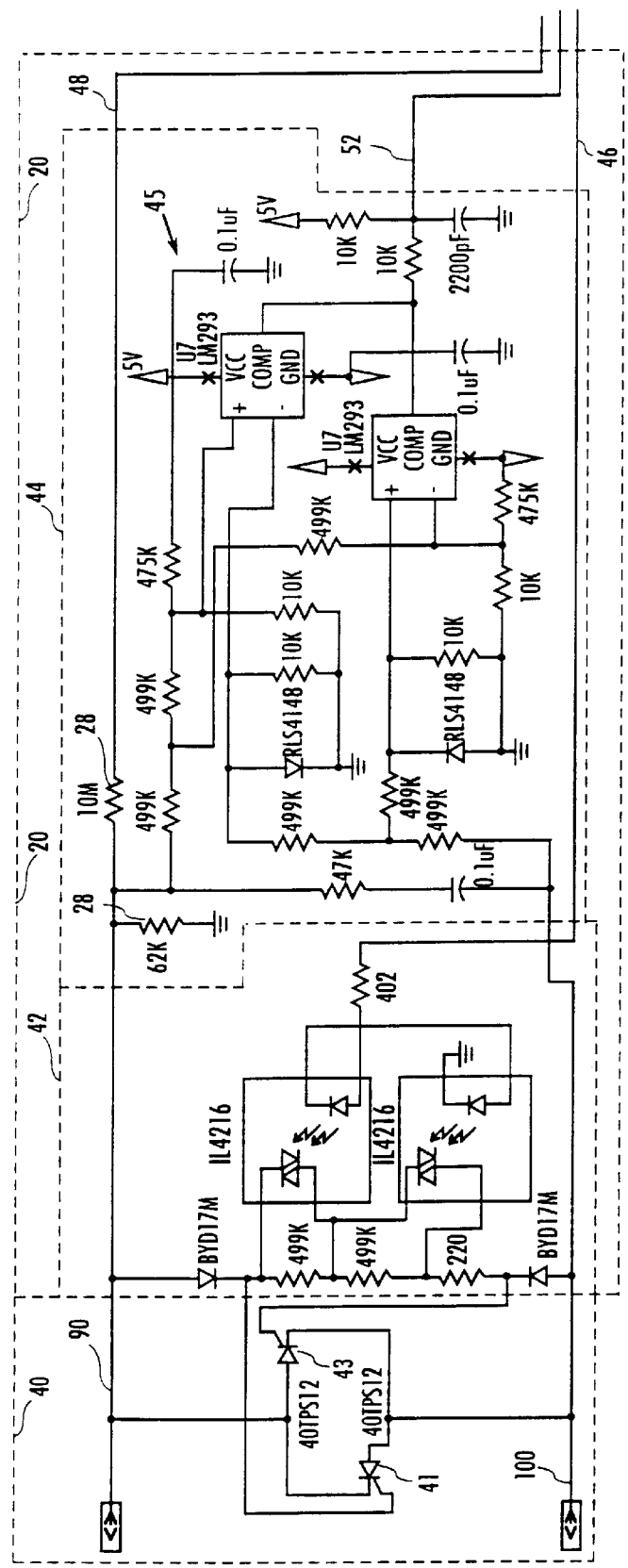
Figure 2D:
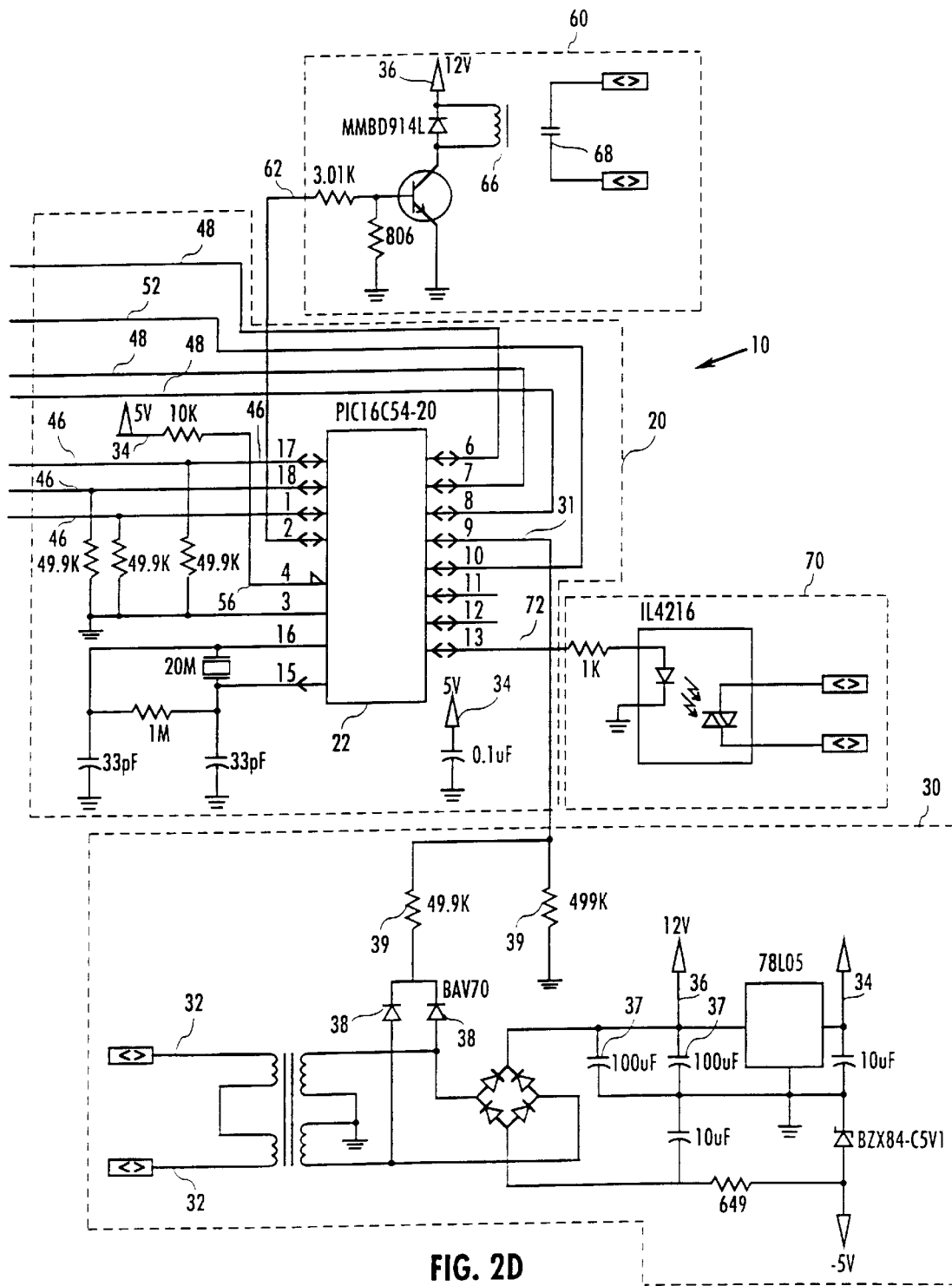

With reference to FIG. 1, a motor control or electronic motor starter system 10 includes a control circuit 20, a power supply 30, a set of three thyristor circuits 40, a contactor 50, a contactor control circuit 60, and a fault alarm circuit 70. Motor starter system 10 is coupled to terminals 100 of a motor 80.

Motor 80 can be a polyphase, a single phase, or a three-phase electric motor wound as either a delta-type or wye-type motor. Preferably, motor 80 is a three-phase alternating current (AC) induction motor. Motor starter system 10 can be configured to have each phase of thyristor circuits 40 coupled directly in series with each phase of the windings of motor 80. The three phases can then be connected in a delta, wye, or wye with neutral return configuration. Alternatively, a delta connection of thyristor circuits 40 can be inserted into the neutral junction of wye-connected motor windings. In other words, a motor in wye, thyristors in wye configuration, a motor in wye, thyristors in delta configuration, and a motor in delta and thyristors in delta configuration are possible. Terminals 101 of motor 80 are shown to demonstrate that conductors 90 can be directly coupled to motor 80 in certain configurations.

Motor starter system 10 has thyristor circuits 40 and contactor 50 coupled to terminals 100 of motor 80. Contactor 50 and thyristor circuits 40 are preferably coupled in parallel and between AC power conductors 90, representing three phases of an AC power signal (e.g., L-1, L-2, and L-3) and terminals 100 of motor 80.

Thyristor circuits 40 can include any type of power semiconductor switches, although a pair of inverse-parallel thyristors 41 and 43 (FIG. 2) for each of circuits 40 is preferred. For example, thyristor circuits 40 can be replaced by circuits including insulated gate bipolar transistors, power field effect transistors, power semiconductor switches, or any device for variably controlling the current from conductors 90 to terminals 100 of motor 80.

Contactor 50 is preferably an AC-1 rated contactor including a set of three contacts (not shown), one for each phase of the AC power signal at conductors 90. The set of three contacts is controlled by at least one coil or similar device (not shown) which is controlled by contactor control circuit 60. Contactor control circuit 60 preferably utilizes a direct current (DC) controlled relay switch to provide AC current to the contactor coil. Therefore, contact control circuit 60 is electromechanically linked to contactor 50. Alternatively, contactor 50 can be replaced by other types of electromechanical or mechanical switches and can be directly controlled by circuit 20. The type of switch device associated with contactor 50 is not discussed in a limiting fashion.

Power supply 30 preferably provides a DC power signal to control circuit 20 so that control circuit 20 can appropriately provide control signals to thyristor circuits 40, contact control circuit 60, and fault alarm circuit 70. Power supply 30 includes motor control inputs 32 which receive a motor control signal. Preferably, power supply 30 converts the motor control signal provided on inputs 32 to the DC power signal for control circuit 20. Generally, the motor control signal is a 24 V AC to 600 V AC signal which was originally designed to power the coil of a conventional electromechanical motor starter (not shown). In this way, motor starter system 10 can simply replace an electromechanical motor starter and does not even need a separate power supply or a power source to operate control circuit 20.

Power supply 30 preferably includes storage capacitors such as capacitors 37 (FIG. 2) to store power so that operations may temporarily continue after the motor control signal is removed from inputs 32. Alternatively, a separate battery or AC power source can be provided for control circuit 20, and a motor control signal can be provided directly to control circuit 20.

With reference to FIG. 2, control circuit 20 of motor starter system 10 includes a microprocessor 22, thyristor firing circuits 42, and voltage level and conduction detection circuits 44. Microprocessor 22 causes thyristor firing circuits 42 to turn on or to fire thyristors 41 and 43 within circuits 40 by providing logic signals or thyristor firing signals on thyristor control lines 46. Thyristor firing circuits 42 provide optical isolation for microprocessor 22. Furthermore, in response to the thyristor firing signals on lines 46, thyristor firing circuits 42 also provide appropriate triggering biases with respect to the AC power signal for thyristor 41 and 43.

Detection circuits 44 utilize resistors 28 coupled between conductors 90 and lines 48 to determine if each of conductors 90 is at the appropriate voltage level. Detection circuits 44 provide voltage level detection signals on lines 48 for receipt by microprocessor 22. The voltage level detection signals are representative of the voltage level associated with conductors 90. The voltage level detection signals on line 48 also allow the microprocessor 22 to monitor the phase relationships on conductors 90.

Detection circuits 44 also utilize a diode, a resistor, and a comparator network 45 which is coupled between each of conductors 90 and terminals 100 to determine if conduction is occurring through thyristors 41 and 43. Circuits 44 provide conduction detection signals on lines 58 for receipt by microprocessor 22. Microprocessor 22 monitors the conduction detection signals on lines 52. The conduction detection signals on lines 52 are representative of the conduction status, or the voltage drop, between lines 90 and terminals 100.

Microprocessor 22 utilizes the voltage level detection signals and the conduction detection signals to monitor the operation of thyristors 41 and 43, of contactor 50, and of motor 80. For example, by analyzing the voltage level detection signals and the conduction detection signals, microprocessor 22 can determine open or missing lines, shorted thyristors 41 and 43, missing load conditions, and other faults associated with the AC power signal, with thyristors 41 and 43 and with motor 80.

Microprocessor 22 has internal circuitry (not shown) which detects when DC power is initially provided from power supply 30. As discussed in more detail below, microprocessor 22 performs software subroutines to start, to control, and to stop motor 80 (FIG. 1) after DC power is initially provided.

Microprocessor 22 provides a contactor control signal at line 62 which causes contact control circuit 60 to provide current through a coil 66. When current is provided through coil 66, relay contact 68 is closed. When contact 68 is closed, contactor 50 (FIG. 1) is also closed. Microprocessor 22 preferably provides the contact control signal on line 62 after motor 80 has been ramped up to its operating speed.

Power supply 30 receives the motor control signal at inputs 32 and transforms the motor control signal to a DC voltage at DC power line 34. DC power line 34 preferably provides 5 V DC and –5 V DC power to control circuit 20, including circuits 44 and microprocessor 22. Additionally, power supply 30 provides a 12 V DC power signal at a conductor 36 to contactor control circuit 60. Fault alarm circuit 70 receives a fault alarm control signal from microprocessor 22 at a control line 72.

Power supply 30 includes a sense circuit comprised of diodes 38 and resistors 39 which allow microprocessor 22 to determine if the motor control signal provided at inputs 32 is present. The sense circuit provides a sense signal to a line 31 which is received by microprocessor 22. When the motor control is absent at inputs 32, diodes 38 do not conduct, and the sense signal at line 31 is a logic low. In contrast, when the motor control signal is present at inputs 32, diodes 38 conduct, and the sense signal is a rectified unfiltered AC signal. Microprocessor 22 monitors line 31 to ensure that the motor control signal is present. Power supply 30 is preferably an AC to DC converter circuit that includes storage capacitors, such as, capacitors 37. Capacitors 37 provide the power signals on lines 34 and 36 for sufficient time after the motor control signal is removed from inputs 32.

The general operation of motor starter system 10 is described with reference to FIGS. 1 and 2 below. When a motor control signal is provided to inputs 32, power supply 30 converts the AC motor control signal to a DC power signal on conductors 34 and 36. Control circuit 20 is powered by the DC power signal on conductor 34, and contactor control circuit 60 is powered by the DC power signal on conductor 36.

Initially providing power on conductor 34 causes microprocessor 22 to perform a reset software routine. The reset software routine includes routines for starting motor 80, operating motor 80 in a run mode after starting, and stopping motor 80.

As part of the reset software routine, microprocessor 22 monitors the voltage level detection signals on lines 48 and the conduction detection signals on lines 52 and provides thyristor firing signals on lines 46. The thyristor firing signals on lines 46 cause thyristors 41 and 43 to conduct in a predetermined fashion. Preferably, the reset software routine causes motor 80 to gradually ramp up to speed, thereby reducing large in-rush currents. Since contactor 50 is only used to carry the running current needed by motor 80, an AC-1 rated contactor 50 (FIG. 1) can be used.

Once motor 80 has reached operating speed (assuming the conduction detection signals and voltage level detection signals on lines 52 and 48, respectively, are appropriate), microprocessor 22 provides a contactor control signal on line 62 which causes contactor control circuit 60 to provide current through coil 66 and then removes the thyristor firing signals from lines 46.

Current through coil 66 causes contact 68 to close, which then causes contactor 50 (FIG. 1) to close, thereby bypassing thyristor circuits 40. Microprocessor 22 continues to monitor the voltage level detection signals and the conduction detection signals, as well as monitor for other types of faults. If a fault is detected, microprocessor 22 can provide a fault alarm signal on line 72 which causes fault alarm circuit 70 to initiate a fault signal, such as, an audio alarm, a light, or other device. Control circuit 20 also removes the AC power signal from motor 80 in response to a fault.

When the motor control signal is removed from inputs 32, microprocessor 22 senses the removal of the motor control signal via line 31 and controls motor 80 to bring motor 80 to a stop. Preferably, microprocessor 22 provides thyristor firing signals on lines 46 to cause thyristors 41 and 43 in thyristor circuits 40 to conduct. Microprocessor 22 also opens contactor 50. The thyristor firing signals on lines 46 are provided to prevent arcing in contactor 50.

Once the removal of the motor control signal is detected, microprocessor 22 sets a watchdog timer for a predetermined time. If the watchdog timer expires, microprocessor 22 assumes that motor 80 is still turning and merely ramps motor 80 to running speed rather than to perform a full start routine. If microprocessor 22 is reset by a power-on reset instead of an expiration of the watch dog timer, motor 80 is assumed to be fully stopped and a full start profile is performed.

In another alternative, microprocessor 22 can set a second timer once motor 80 is stopped. The second timer can prevent system 10 from starting and stopping too many times in a period of time (e.g., limit the duty cycle of system 10), thereby ensuring that too much heat is not generated within circuits 40.

With reference to FIGS. 1–7 and specifically to FIGS. 3–7, the operation of system 10 is discussed below as follows. Reset software routine 102 is utilized to control the operation of motor 80. When microprocessor 22 is powered-on at a step 104, microprocessor 22 proceeds to a step 110 and initializes variables for the operation of motor 80. At a step 112, microprocessor 22 monitors the voltage level detection signals on lines 48 and determines the phase rotation associated with conductors 90.

At a step 114, microprocessor 22 determines if the rotation is the correct rotation (e.g. ABC rather than CBA). If the rotation is correct, microprocessor 22 advances to a step 120. If not, microprocessor 22 advances to a fatal error routine 500 discussed below with reference to FIG. 7. Alternatively, if either phase rotation is acceptable, microprocessor 22 can always advance to a step 120.

At step 120, microprocessor 22 determines the line frequency by monitoring the voltage level detection signals at lines 48. In accordance with the line frequency, microprocessor 22 sets initial firing times for thyristors 41 and 43 within circuits 40. At a step 124, microprocessor 22 initializes running variables for the starting of motor 80 and advances to a running routine 200. For example, the variables can be related to thyristor refiring delay or notch size associated with providing the AC power signal to motor 80 or to the calculation of firing times for thyristors 41 and 43.

Figure 4:
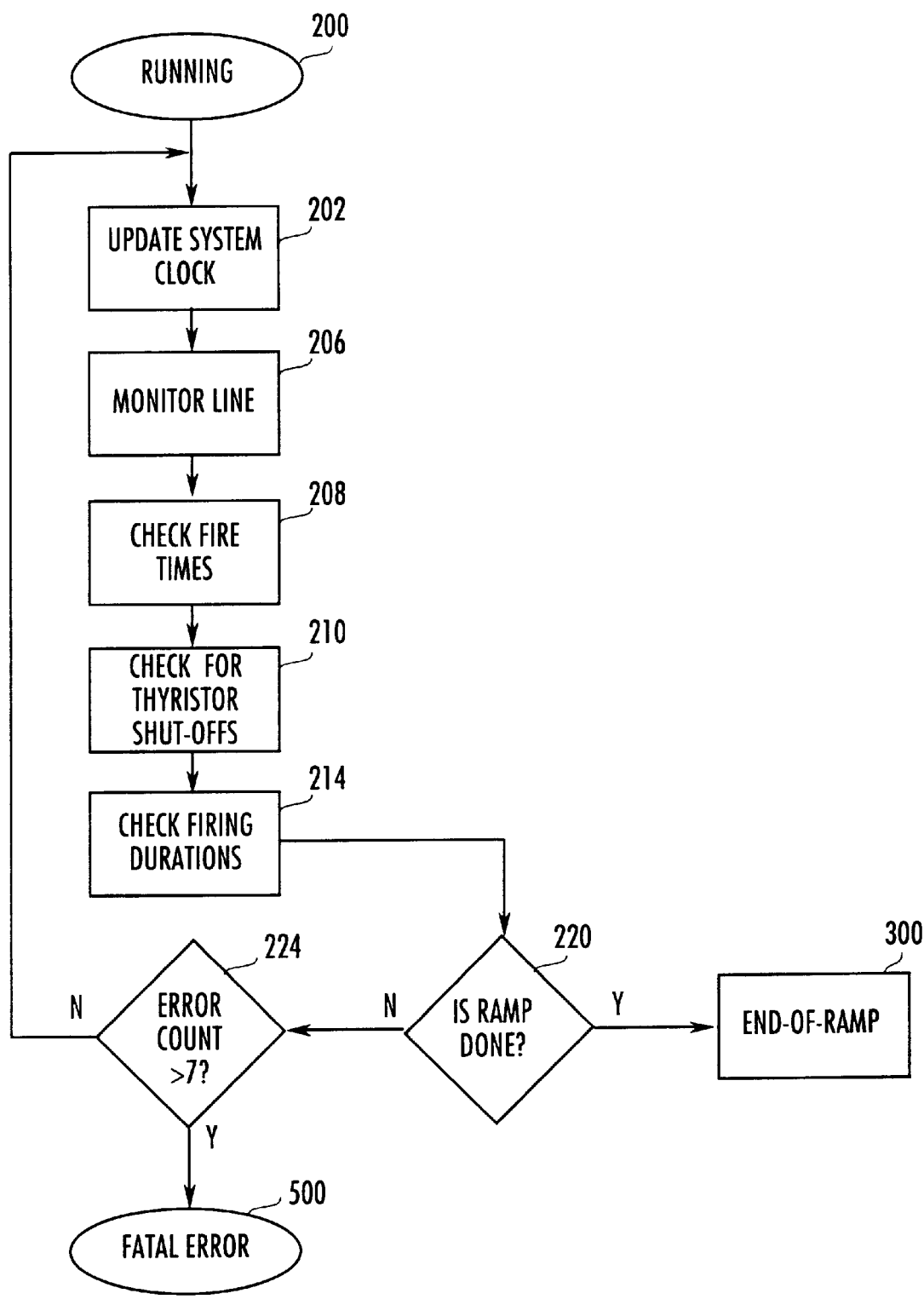
FIG. 4 is a flow chart of the running routine illustrated in FIG. 3, wherein the running routine includes an end-of-ramp routine.

With reference to FIG. 4 in running routine 200, microprocessor 22 advances to a step 202 and updates a system clock. The system clock is used to track the timing of various operations, including the firing of thyristors 41 and 43. At a step 206, microprocessor 22 monitors the voltage level detection signals on lines 48 to determine if the AC power signal is appropriately provided on conductors 90.

At a step 208, microprocessor 22 determines the firing times associated with thyristors 41 and 43. At a step 210, microprocessor 22 determines if thyristors 41 and 43 have shut off and calculates when refiring of thyristors 41 and 43 should occur. At a step 214, microprocessor 22 determines if the thyristor firing signals on lines 46 should be removed in accordance with the firing durations calculated in step 208.

Microprocessor 22 can provide various start profiles in which the motor start is performed through the controlled application of current to motor 80. For example, by controlling the time delay between refiring thyristors 41 and 43 after they have shut off, current to motor 80 can be controlled. Precise starting and stopping criteria for adjusting the firing of thyristors 41 and 43 is beyond the scope of this invention.

After step 214, microprocessor 22 advances to a step 220 and determines if the ramping up of motor 80 to its operating speed is complete in accordance with the motor control criteria. If so, microprocessor 22 advances to an end-of-ramp routine 300 discussed below with reference to FIG. 5. If not, microprocessor 22 advances to a step 224 and determines if an error count is greater than seven. If not, microprocessor 22 returns to step 220. If the error count is greater than seven, microprocessor 22 advances to fatal error routine 500.

Microprocessor 22 monitors the voltage level detection signals on lines 48 and the conduction detection signals on lines 52 to determine if an error has occurred. Microprocessor 22 keeps tracks of errors. If the error count is greater than seven, microprocessor 22 determines that a fatal error has occurred. Errors can involve disappearance of the AC power signal on conductors 90, open-circuited thyristors 41 and 43, loss of load, short-circuited thyristors 41 and 43, as well as other malfunctions.

Figure 5:
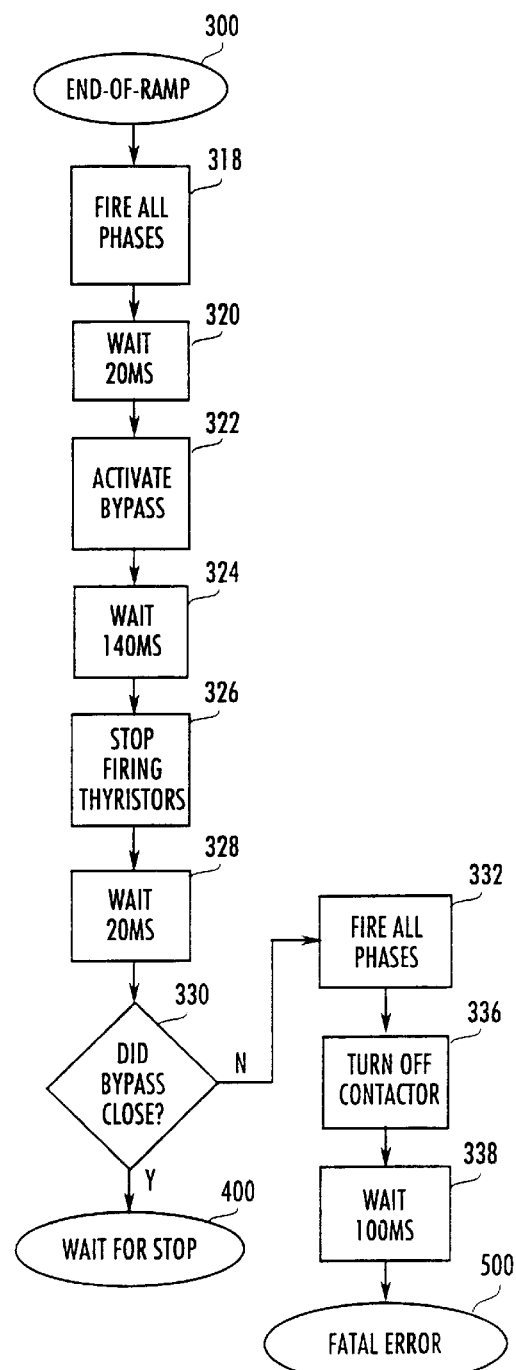
FIG. 5 is a flow chart of the end-of-ramp routine illustrated in FIG. 4, wherein the end-of-ramp routine includes a wait-for-stop routine.

With reference to FIG. 5, microprocessor 22 performs end-of-ramp routine 300 as motor 80 preferably reaches its running speed. After end-of-ramp routine 300, system 10 enters a run mode, and motor 80 receives the AC power signal from conductors 90 through contactor 50.

At a step 318, microprocessor 22 fires thyristors 41 and 43 in circuits 40 for all three phases. At a step 320, microprocessor 22 waits for a period of 20 milliseconds. At a step 322, microprocessor 22 provides a contactor control signal on line 62 which closes contact 68. When contact 68 is closed, contactor 50 is closed. At a step 324, microprocessor 22 waits 140 milliseconds. At a step 326, microprocessor 22 removes the thyristor firing signals from lines 46 so that thyristors 41 and 43 are turned off during the next phase of the AC power signal. The timing periods discussed above and below can be adjusted for particular system parameters such as contactor ratings or characteristics. Microprocessor 22 preferably ensures that there is a low voltage potential across contactor 50 when it is opened and closed.

At a step 328, microprocessor 22 waits 20 milliseconds. At a step 330, microprocessor 22 monitors the voltage level detection signals and the conduction detection signals to determine if contactor 50 is closed. If microprocessor 22 determines that contactor 50 is closed, microprocessor 22 advances to wait-for-stop routine 400 (e.g., enters a run mode) discussed below with reference to FIG. 6.

If it appears that not all phases of contactor 50 are closed, microprocessor 22 fires thyristors 41 and 43 for all three phases at a step 332. At a step 336, microprocessor 22 removes the contactor control signal on line 62 so that contact 68 is open, thereby opening contactor 50 (if it was closed or partially closed). At a step 338, microprocessor 22 waits 100 milliseconds and advances to fatal error routine 500.

Figure 6:
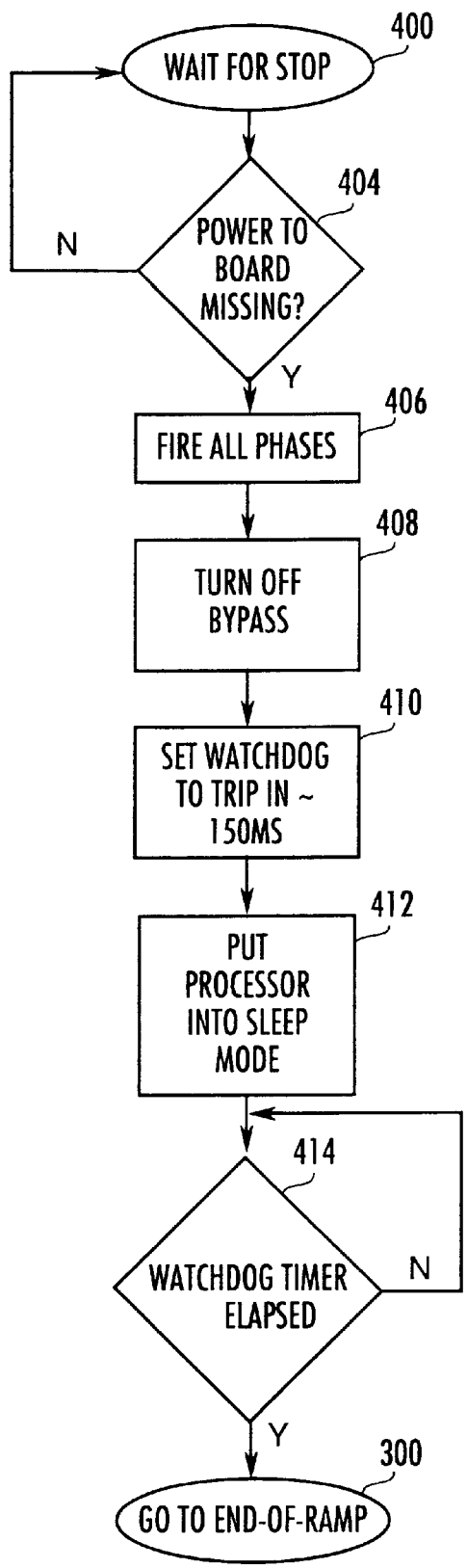
FIG. 6 is a flow chart illustrating the wait-for-stop routine illustrated in FIG. 5.

With reference to FIG. 6, microprocessor 22 enters wait-for-stop routine 400 after contactor 50 is closed. Microprocessor 22 monitors the power provided at inputs 32 via line 31. If microprocessor 22 determines that power is provided at inputs 32, microprocessor 22 returns to step 404. If the motor control signal is removed from inputs 32, microprocessor 22 advances to a step 406 and fires thyristors 41 and 43 on all three phases of the AC power signal. At a step 408, microprocessor 22 removes the contactor control signal at line 62, thereby opening contactor 50. At a step 410, microprocessor 22 sets the watchdog timer to trip in 150 milliseconds. At a step 412, microprocessor 22 is put to sleep. Microprocessor 22 keeps all outputs at their present status until completely off. Microprocessor 22 should be completely off in approximately 80 milliseconds if the signal at input 32 is not provided to power supply 30. Microprocessor 22 and, hence, system 10 remain in the sleep mode until it is completely off.

Figure 3:
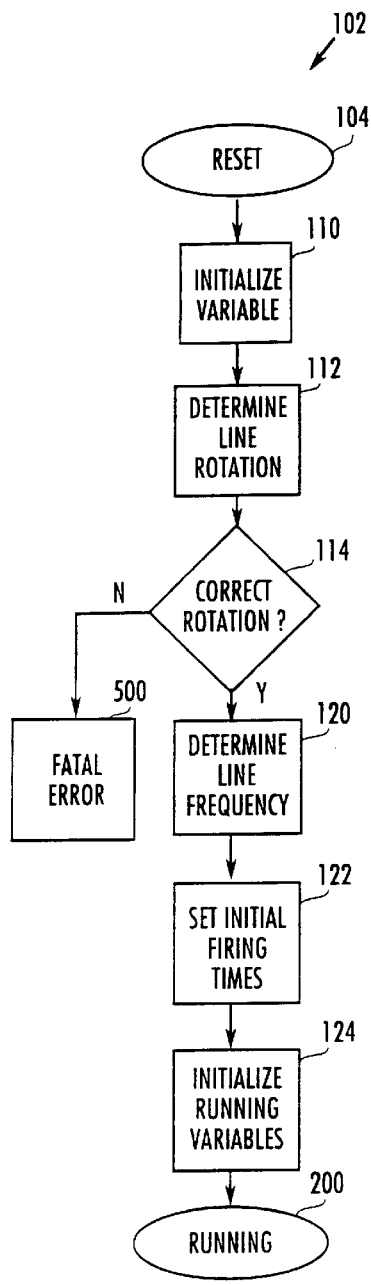
FIG. 3 is a flow chart showing a software reset routine for the motor starter system illustrated in FIG. 1, wherein the software reset routine includes a running routine and a fatal error routine.

If the watchdog timer has expired, microprocessor 22 advances to a step 414. The watchdog timer can expire if microprocessor 22 receives power from supply 30 before being completely off. After step 414, microprocessor 22 advances to end-of-ramp routine 300. As discussed above, microprocessor 22 advances to end-of-ramp routine 300 so that a full start routine is not initiated if the power was removed for only a short period of time (e.g., motor 80 is assumed to be turning). If microprocessor 22 is completely off, power at input 32 causes processor 22 to initiate reset routine 102 at step 104 (FIG. 3).

During wait-for-stop routine 400 at step 404, microprocessor 22 continues to monitor the voltage level detection signals and the conduction detection signals to ensure that motor 80 and system 10 are operating properly. If microprocessor 22 detects that a fatal error has occurred, microprocessor 22 can proceed to fatal error routine 500.

Figure 7:
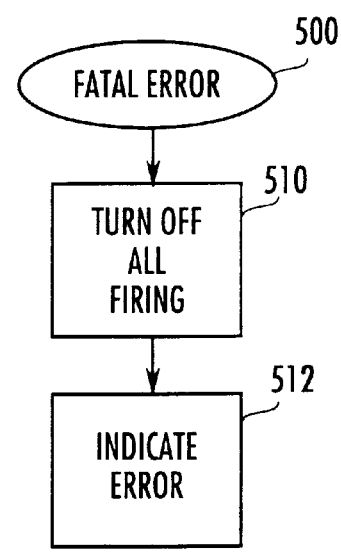
FIG. 7 is a flow chart of the fatal error routine illustrated in FIG. 3.

With reference to FIG. 7, fatal error routine 500 includes a step 510 and a step 512. At a step 510, microprocessor 22 removes all thyristor firing signals at lines 46, thereby turning off all firing of thyristors 41 and 43. At step 512, microprocessor 22 provides a fault alarm control signal on control line 72. Fault alarm control circuit 70 preferably provides indicia of the fault in response to the fault alarm control signal. For example, fault alarm control circuit 70 can control an audio, visual alarm, or as an input to another controller. Microprocessor 22 is preferably a fast microcontroller or processor having internal memory such as a 512 byte program memory.

It is understood that, while the detailed drawings, specific examples, and particular materials given describe preferred exemplary embodiments of the present invention, they are for the purpose of illustration only. The method and apparatus of the present invention is not limited to the precise details and conditions disclosed. For example, although particular flow charts are described, various software subroutines may accomplish the functions recited in claims. Additionally, although particular circuit components and values are given in the drawings, the values and component given are for illustration purposes only and do not limit the scope of the invention. Various changes may be made to the details disclosed without departing from the spirit of the invention which is defined by the following claims.

What is claimed is:

1. A motor control system for receiving a motor run signal and controlling a motor in response to the motor run signal, the motor being powered by an AC power signal, the motor control system comprising:

a power supply having a control input and a power output, the control input receiving the motor run signal and the power supply providing a DC power signal at the power output in response to the motor run signal, wherein power for the DC power signal is derived from the motor run signal; and a control circuit receiving the DC power signal and performing a motor control routine in response to the DC power signal, the control circuit applying the AC power signal to the motor in response to the motor control routine, the control circuit being powered by the DC power signal.

2. The motor control system of claim 1, wherein the motor control routine includes a start routine and a run routine.

3. The motor control system of claim 2, wherein the start routine is begun in response to a change from an absence of the DC power signal to a presence of the DC power signal.

4. The motor control system of claim 3, wherein when the control circuit performs the run routine, the control circuit closes a relay to connect the AC power signal to the motor.

5. The motor control system of claim 4, wherein the control circuit opens the relay to disconnect the AC power signal to the motor in response to the absence of the DC power signal.

6. The motor control system of claim 3, wherein the control circuit includes a microprocessor having a power on reset circuit, the microprocessor performing the start routine in response to the power on reset.

7. The motor control circuit of claim 1, wherein the AC power signal is a three-phase power signal.

8. A motor controller for providing a motor power signal from a power line to a motor in response to a motor control signal, the motor controller comprising:

a mechanical switch coupled between the power line and the motor;

a semiconductor switch coupled between the power line and the motor;

a power supply having an input and an output, the input receiving the motor control signal and the output providing a circuit power signal in response to a presence of the motor control signal; and a control circuit receiving the circuit power signal, the control circuit providing the motor power signal through the semiconductor switch when the circuit power signal is initially provided and later providing the motor power signal through the mechanical switch wherein the power supply is powered by the motor control signal and the control circuit is powered by the circuit power signal.

9. The motor controller of claim 8, wherein the motor control signal is an AC signal.

10. The motor controller of claim 9, wherein the power supply is an AC to DC converter.

11. The motor controller of claim 10, wherein the control circuit includes a microprocessor operating a power-on-reset subroutine.

12. The motor controller of claim 8, wherein the power supply provides the circuit power signal for a predetermined period of time after the motor control signal is removed, the control circuit providing the motor power signal through the semiconductor switch during the predetermined time period.

13. The motor controller of claim 12, wherein the control circuit ceases to provide the motor power signal after the predetermined time.

14. A motor control system for receiving a motor run signal and for controlling a motor in response to the motor run signal, the motor being powered by an AC power signal, the motor control system comprising:

a first switch means for providing the AC power signal to the motor in response to a first control signal;

a second switch means for providing the AC power signal to the motor in response to a second control signal;

a power supply means for receiving the motor run signal and for converting the motor run signal to a DC power signal; and a control means for providing the second control signal when the DC power signal is initially received and for subsequently providing the first control signal, the control means being powered by the DC power signal.

15. The motor control system of claim 14, wherein the control means includes a microprocessor, the microprocessor performing a software motor control routine to provide the first control signal and the second control signal.

16. The motor control system of claim 15, wherein the motor control routine includes a start routine and a run routine, the start routine providing the second control signal and the run routine providing the first control signal.

17. A method of controlling a motor with an electronic motor starter system, including a motor control input, a control circuit, a semiconductor switch, and a mechanical switch, the method comprising:

converting a motor control signal provided to the motor control input to a DC power signal and powering the control circuit with the DC power signal;

providing a motor power signal to the motor by closing the semiconductor switch with the control circuit when the control circuit is initially powered; and subsequently providing the motor power signal to the motor by closing the mechanical switch with the control circuit.

18. The method of claim 17, further comprising:

closing the semiconductor switch; and subsequently opening the mechanical switch after the motor control signal is removed.

19. The method of claim 17, wherein the powering step includes converting the motor control signal to a low voltage DC signal.

20. The method of claim 18, wherein the mechanical switch is an AC-1 rated contactor.

* * * * *